(12) United States Patent
Chin

(10) Patent No.: US 12,448,708 B2
(45) Date of Patent: Oct. 21, 2025

(54) EXTENDED INNER PROFILE FOR MANDREL FOR USE IN FORMING BRAIDED CMC STRUCTURES

(71) Applicant: RTX Corporation, Farmington, CT (US)

(72) Inventor: Jonathan L. Chin, Morrisville, NC (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/442,870

(22) Filed: Feb. 15, 2024

(65) Prior Publication Data
US 2025/0263872 A1    Aug. 21, 2025

(51) Int. Cl.
| | |
|---|---|
| *D04C 3/48* | (2006.01) |
| *D04C 1/02* | (2006.01) |
| *D04C 3/40* | (2006.01) |
| *C04B 35/80* | (2006.01) |

(52) U.S. Cl.
CPC ............... *D04C 3/48* (2013.01); *D04C 1/02* (2013.01); *D04C 3/40* (2013.01); *C04B 35/80* (2013.01); *C04B 2235/5252* (2013.01); *C04B 2237/38* (2013.01); *D10B 2505/02* (2013.01)

(58) Field of Classification Search
CPC ... D04C 3/40; D04C 3/48; D04C 1/02; D10B 2505/02
USPC .............................................. 87/34
See application file for complete search history.

(56) References Cited

U.S. PATENT DOCUMENTS

| | | | | |
|---|---|---|---|---|
| 376,372 | A * | 1/1888 | Dodge et al. | A43B 1/023 87/8 |
| 4,494,436 | A * | 1/1985 | Kruesi | B29B 15/122 87/34 |
| 4,519,290 | A * | 5/1985 | Inman | F02K 9/97 87/9 |
| 4,916,997 | A * | 4/1990 | Spain | C03C 14/002 87/8 |
| 7,093,527 | B2 * | 8/2006 | Rapaport | A61F 2/90 87/34 |

(Continued)

FOREIGN PATENT DOCUMENTS

WO    2022/219263  A1    10/2022

OTHER PUBLICATIONS

European Search Report for EP Application No. 25157822.5 dated Jul. 14, 2025.

*Primary Examiner* — Shaun R Hurley
(74) *Attorney, Agent, or Firm* — Carlson, Gaskey & Olds, P.C.

(57) ABSTRACT

A method includes the steps of placing a mandrel into a braiding machine the mandrel having a radially outer tang and a radially inner tang for holding the mandrel relative to the braiding machine. The radially outer tang having a width between the leading edge and the trailing edge smaller than a distance between the leading edge and trailing edge of the mandrel such that there is a ledge leading into the outer tang. The mandrel body has a width in a direction between the leading edge and the trailing edge that transitions into the inner tang beyond a location that will serve as a base for the braided material. Ceramic matrix composite ("CMCs") yarn is braided about a portion of the mandrel which serves as the base for the braided yarn to form a shear tube. A mandrel is also disclosed.

19 Claims, 5 Drawing Sheets

(56) References Cited

U.S. PATENT DOCUMENTS

| | | | | |
|---|---|---|---|---|
| 8,061,253 B2* | 11/2011 | Wybrow | ............... | B29C 70/545 |
| | | | | 87/13 |
| 8,394,222 B2* | 3/2013 | Rettig | ..................... | B29C 70/38 |
| | | | | 156/169 |
| 8,419,374 B2* | 4/2013 | Huth | ..................... | B29C 70/865 |
| | | | | 416/224 |
| 8,690,962 B2* | 4/2014 | Dignam | ............... | B29C 70/222 |
| | | | | 87/9 |
| 8,813,626 B2* | 8/2014 | Huang | ................... | B29C 70/08 |
| | | | | 87/34 |
| 11,530,614 B2* | 12/2022 | Burdette | ................ | F01D 5/189 |
| 2002/0160068 A1* | 10/2002 | Nakamura | ............... | D04C 3/48 |
| | | | | 264/103 |
| 2004/0200014 A1* | 10/2004 | Pons | ....................... | A43D 3/02 |
| | | | | 12/145 |
| 2009/0014926 A1 | 1/2009 | Marini | | |
| 2010/0083815 A1* | 4/2010 | Inazawa | ................. | B29C 70/32 |
| | | | | 87/9 |
| 2012/0031544 A1 | 2/2012 | Metivier | | |
| 2013/0305911 A1* | 11/2013 | Masson | ................... | D04C 3/34 |
| | | | | 87/9 |
| 2016/0076178 A1* | 3/2016 | Head | ........................ | D04C 3/48 |
| | | | | 87/54 |
| 2016/0166000 A1* | 6/2016 | Bruce | ................ | A43B 23/0245 |
| | | | | 87/34 |
| 2016/0201478 A1 | 7/2016 | Kray et al. | | |
| 2016/0289873 A1* | 10/2016 | Head | ........................ | B32B 5/02 |
| 2022/0268165 A1 | 8/2022 | Burdette et al. | | |
| 2023/0173623 A1 | 6/2023 | Schneider et al. | | |

\* cited by examiner

EXTENDED INNER PROFILE FOR MANDREL FOR USE IN FORMING BRAIDED CMC STRUCTURES

BACKGROUND

This invention relates to a mandrel that is utilized as a base for forming a braided structure from CMC yarn.

Gas turbine engines are known, and typically include a propulsor delivering air as propulsion. The air is also delivered into a compressor where it is compressed. The compressed air is then delivered into a combustor where it is mixed with fuel and ignited. Products of this combustion pass downstream over turbine rotors, driving them to rotate.

It is known that the products of combustion are quite hot. Thus, the components in the turbine section must withstand high temperature. It has been proposed to utilize ceramic matrix composites ("CMCs") to form turbine components. One particular turbine component that may be formed from CMCs is a static vane. The static vane has an airfoil extending between an inner and outer platform. Within the static vane there are typically hollow channels.

To form the airfoil from CMCs, a mandrel is provided, and CMC yarn is braided around the mandrel. This then serves as a shear tube which is a base for outer CMC fabric layers. The shear tube interior forms a channel in the airfoil.

During the braiding operation, the mandrel is held within a braiding machine by a radially outer tang and a radially inner tang. The tangs extend beyond the portion of the mandrel which is forming the base for the braiding of yarn.

As gas turbine engine vanes advance, the size of the channels also becomes more complex. In some vanes the channel might be quite small such that the mandrel is also small.

In the prior art, the tang has typically been a tab extending away from a platform defining the end of the braiding surface on the mandrel. As the mandrel becomes smaller, the tang may be subject to fracture.

SUMMARY

In a featured embodiment, a method of forming a gas turbine engine component having an airfoil includes the steps of placing a mandrel into a braiding machine, with the mandrel having a mandrel body, a radially outer tang and a radially inner tang for holding the mandrel relative to the braiding machine. The mandrel extends between a leading edge and a trailing edge and the radially outer tang with a width in a direction between the leading edge and the trailing edge that is smaller than a distance between the leading edge and trailing edge of the mandrel such that there is a ledge leading into the outer tang. The mandrel body has a width in a direction between the leading edge and the trailing edge that transitions into the inner tang beyond a location that will serve as a base for the braided material, and the mandrel body transitions smoothly into the inner tang. Ceramic matrix composite ("CMCs") yarn is braided about a portion of the mandrel which serves as the base for the braided yarn to form a shear tube.

In another embodiment according to the previous embodiment, CMC layers are then placed outwardly of the braided shear tube to form an intermediate vane.

In another embodiment according to any of the previous embodiments, the intermediate vane is then placed into a densifying chamber wherein the CMC materials are densified.

In another embodiment according to any of the previous embodiments, the inner tang has a locating pin hole that receives a pin from a holding structure such that the intermediate vane is properly positioned within the densifying chamber.

In another embodiment according to any of the previous embodiments, the braiding machine has a plurality of spools of CMC yarn that are braided onto the outer surface of the mandrel.

In another embodiment according to any of the previous embodiments, a plurality of shear tubes are formed by distinct mandrels and then utilized to form the intermediate vane.

In another embodiment according to any of the previous embodiments, the intermediate vane has a plurality of hollow channels, and the shear tubes define the hollow channels, and serve as a base for the outer CMC fabric layers.

In another embodiment according to any of the previous embodiments, the inner tang has a thickness that decreases from the radially outer end to a radially inner end.

In another embodiment according to any of the previous embodiments, the braiding machine has a plurality of spools of CMC yarn that are braided onto the outer surface of the mandrel.

In another embodiment according to any of the previous embodiments, a plurality of shear tubes are formed by distinct mandrels and then utilized to form the intermediate vane.

In another embodiment according to any of the previous embodiments, the intermediate vane has a plurality of hollow channels, and the shear tubes define the hollow channels, and serve as a base for the outer CMC fabric layers.

In another embodiment according to any of the previous embodiments, the inner tang has a thickness that decreases from the radially outer end to a radially inner end.

In another embodiment according to any of the previous embodiments, the inner tang has a thickness that decreases from the radially outer end to a radially inner end.

In another embodiment according to any of the previous embodiments, the braiding machine has a plurality of spools of CMC yarn that are braided onto the outer surface of the mandrel.

In another embodiment according to any of the previous embodiments, a plurality of shear tubes are formed by distinct mandrels and then utilized to form the intermediate vane.

In another embodiment according to any of the previous embodiments, the inner tang has a thickness that decreases from the radially outer end to a radially inner end.

In another embodiment according to any of the previous embodiments, the intermediate vane is then placed into a densifying chamber wherein the CMC materials are densified.

In another featured embodiment, a mandrel to provide a base for braiding yarn includes a mandrel body, a radially outer tang and a radially inner tang for holding the mandrel relative to a braiding machine. The mandrel body extends between a leading edge and a trailing edge and the outer tang has a width in a direction between the leading edge and the trailing edge that is smaller than a distance between the leading edge and trailing edge of the mandrel body such that there is a ledge leading into the outer tang. The mandrel body has a width in a direction between the leading edge and the trailing edge that transitions into the inner tang beyond a location that will serve as a base for the braided material, the mandrel body transitions smoothly into the inner tang.

In another embodiment according to any of the previous embodiments, the inner tang has a thickness that decreases from the radially outer end to a radially inner end In another embodiment according to any of the previous embodiments, the inner tang has a thickness that decreases from the radially outer end to a radially inner end.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
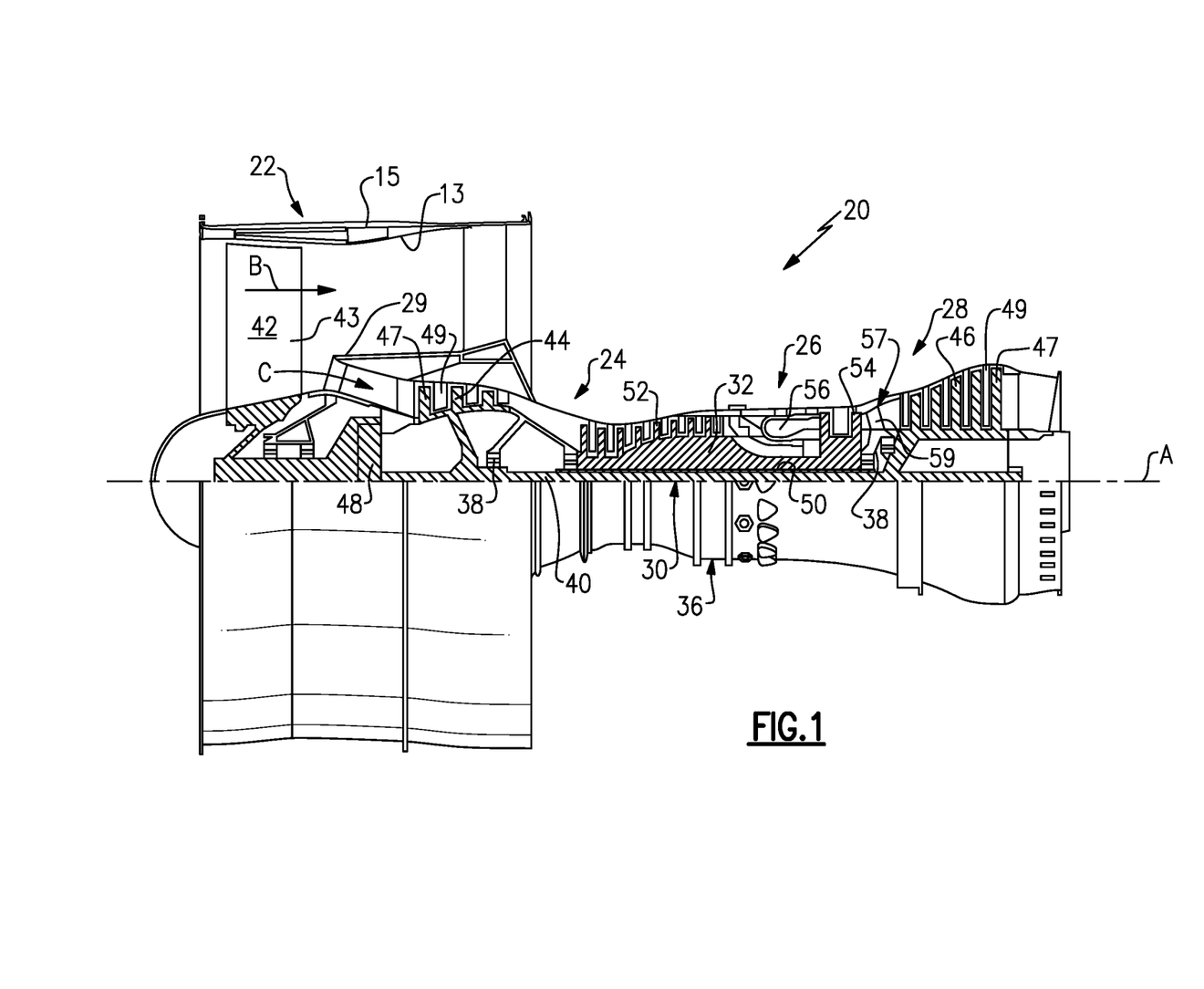
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °\ R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F.

and 975.0° F. The relatively low EGT can be utilized in combination with the other techniques disclosed herein to reduce fuel consumption.

Figure 2:
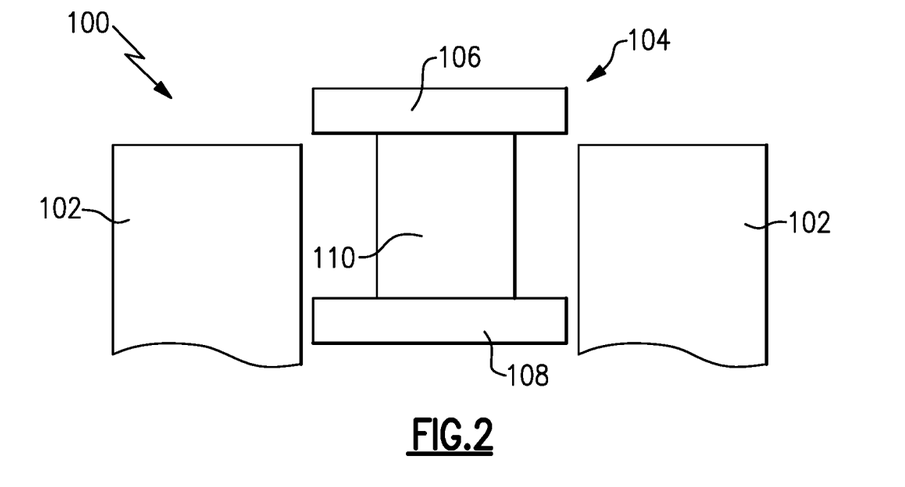
FIG. 2 schematically shows a turbine section.

FIG. 2 schematically shows a turbine section 100. Rotating turbine blades 102 are spaced by intermediate static vanes 104. Vanes 104 include an outer platform 106, an inner platform 108, and an intermediate connecting airfoil 110.

Figure 3:
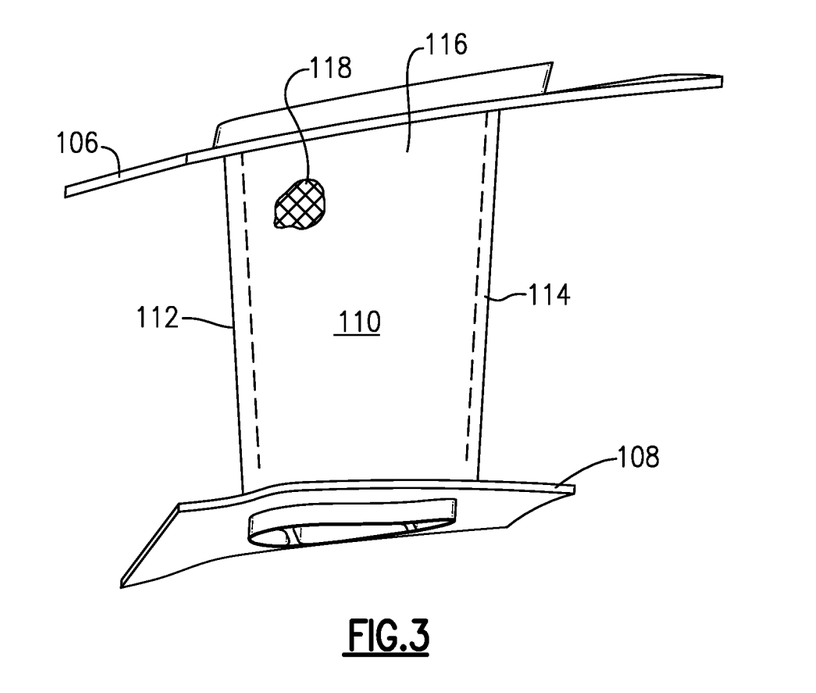
FIG. 3 shows a static vane in a gas turbine engine.

As shown in FIG. 3, the airfoil 110 extends from a leading edge 112 to a trailing edge 114. An outer structure 116 of the airfoil 110 is shown. An inner braided structure 118 is also shown, and may be called a shear tube. The shear tube 118 is formed of CMC yarn. A CMC material forming outer airfoil layers 116 is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

Figure 4:
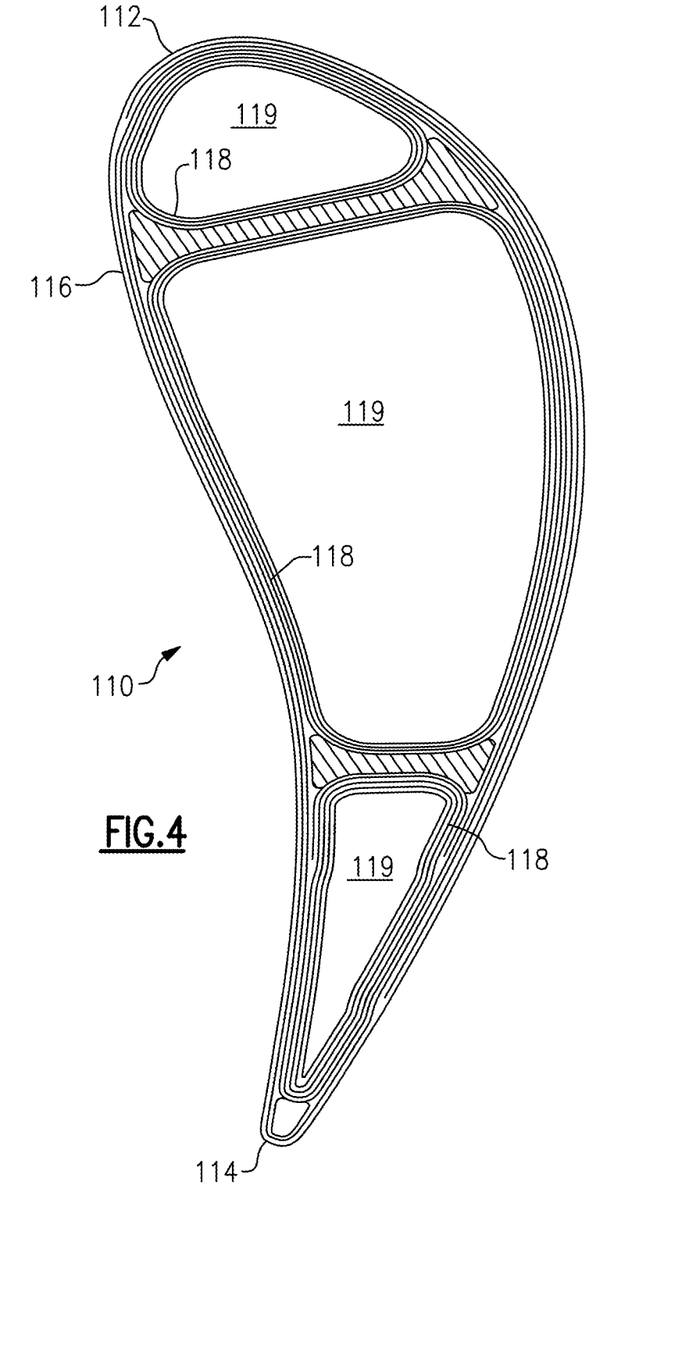
FIG. 4 is a cross-sectional view through the airfoil of the FIG. 3 vane.

FIG. 4 is a cross-sectional view through the FIG. 3 airfoil. As shown, there are braided CMC yarn shear tubes 118 sitting within outer layers of CMC fabric 116 and defining channels 119.

Figure 5:
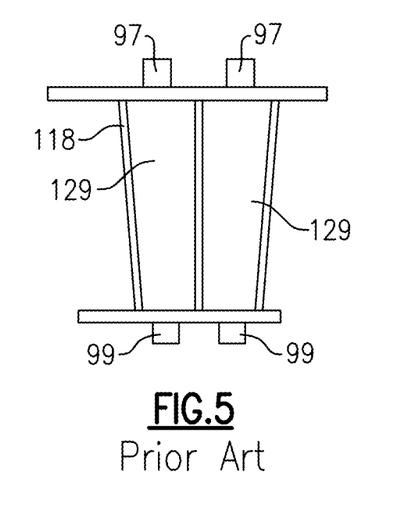
FIG. 5 schematically shows the formation of interior components within the FIG. 3 vane.

FIG. 5 schematically shows a mandrel 129 which forms the shear tube 118. The mandrel 129 is as known in the prior art. A mandrel body extends for a first relatively great width. Radially outer tangs 97 and radially inner tangs 99 extend for a width that is less than the width of the mandrel body 129. In a sense, the tangs extend from a ledge defining an end of the mandrel body 129. As the vane gets smaller, the inner tang will become smaller, and more subject to fracture.

Figure 6:
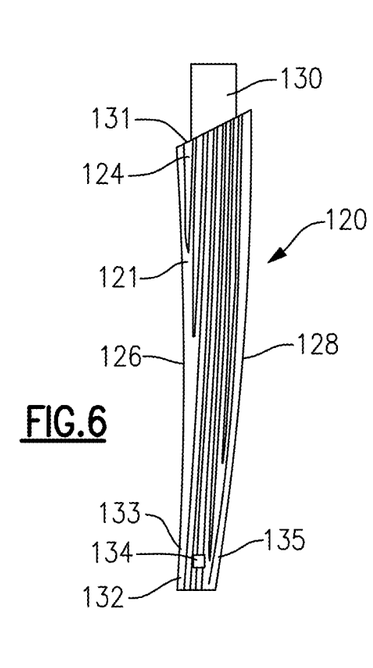
FIG. 6 shows a mandrel which is utilized to form the interior component.

As shown in FIG. 6, a mandrel 120 as disclosed here includes an outer surface 121 with grooves 124. The mandrel is received within the vane 104 as formed when the CMC materials are "densified." The grooves 124 assist in movement of the densifying material into the interior of the shear tube 118.

As shown, mandrel 120 extends from a leading edge 126 to a trailing edge 128. An outer tang 130 extends away from a ledge 131. Tang 130 is smaller than the ledge 131. An inner tang 132 extends along the same profile as the mandrel 120 at both the leading edge 126 and trailing edge 128.

One can see there is a smooth transition between the end 133 and 135 of where the braided yarn will stop and continuing onto the tang 132. The tang 132 is also provided with a positioning hole 134 for a reason to be described below.

The inner tang 132 has a thickness that decreases from the radially outer end to a radially inner end.

Figure 7:
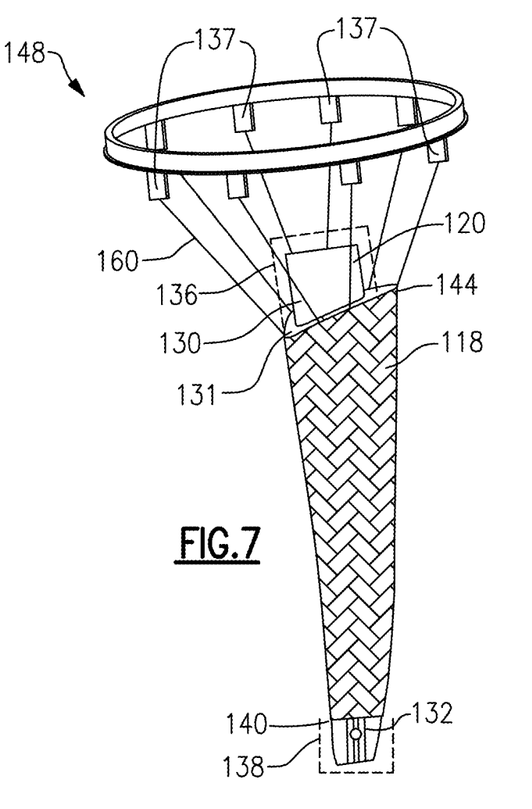
FIG. 7 shows the FIG. 6 mandrel receiving braided yarn.

FIG. 7 schematically shows a braiding arrangement 148. The tang 132 is held in positioning structure 138. The tang 130 is held in positioning structure 136. The positioning structure is as known, as is the braiding machine 148. A plurality of yarn spools 137 are connected through a ring 135, and braid yarns 160 about the outer surface 121 of the mandrel 120 to form shear tube 118. Note tang 130 extends beyond an upper end 144 of the braided yarn structure. Similarly, tang 132 extends beyond a lower end 140 of the braided yarn structure.

Since the inner tang 132 has a greater thickness than in the prior art, it is less subject to fracture, even as size of the overall mandrel 120 becomes smaller.

In embodiments, the mandrel may be formed with an appropriate graphite material.

Figure 8:
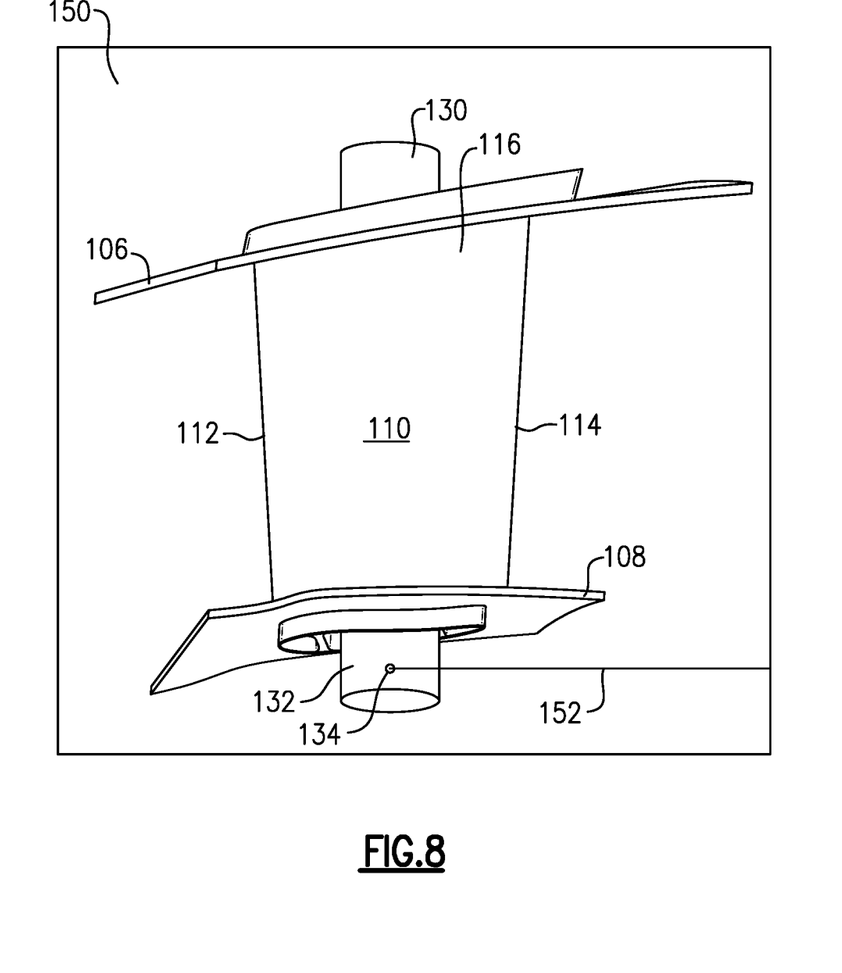
FIG. 8 shows a step subsequent to the FIG. 7 step.

FIG. 8 shows the subsequent step. After formation of the shear tube 118, the outer fabric layers are laid upon the braided shear tube 118.

Then, the intermediate vane 104 is placed in a so-called "clam shell" 150 in which the densifying material is injected into the CMC materials forming the intermediate vane 104. As shown, the locating hole 134 receives holding structure 152 from the clam shell 150 such that the vane 104 is properly positioned during intensification. Clam shell 150 may be as known.

In fact, in some embodiments the densification may be a multi-step process. As an example, there may be an initial run which applies an interface coating on the fiber to partially densify the matrix. The mandrel may then be removed, and further densification steps may be performed.

A method of forming a gas turbine engine component having an airfoil under this disclosure could be said to include the steps of placing a mandrel into a braiding machine. The mandrel has a body, a radially outer tang and a radially inner tang for holding the mandrel relative to the braiding machine. The mandrel extends between a leading edge and a trailing edge. The outer tang has a width in a direction between the leading edge and the trailing edge that is smaller than a distance between the leading edge and trailing edge of the mandrel body such that there is a ledge leading into the outer tang. The mandrel has a width in a direction between the leading edge and the trailing edge that transitions into the inner tang beyond a location that will serve as a base for the braided material and the mandrel body transitions smoothly into the inner tang. Ceramic matrix composite ("CMCs") yarn is braided about a portion of the mandrel which serves as the base for the braided yarn to form a shear tube.

A mandrel to provide a base for braiding yarn under this disclosure could be said to include a mandrel having a mandrel body having a radially outer tang and a radially inner tang for holding the mandrel relative to a braiding machine. The mandrel extends between a leading edge and a trailing edge. The radially outer tang has a width in a direction between the leading edge and the trailing edge that is smaller than a distance between the leading edge and trailing edge of the mandrel body such that there is a ledge leading into the outer tang. The mandrel body has a width in a direction between the leading edge and the trailing edge that transitions into the inner tang beyond a location that will serve as a base for the braided material. The mandrel body transitions smoothly into the inner tang.

Although embodiments of this disclosure have been disclosed, a worker of ordinary skill in this art would recognize that modifications would come within the scope of this disclosure. For that reason, the following claims should be studied to determine the true scope and content of this disclosure.

What is claimed is:

1. A method of forming a gas turbine engine component having an airfoil comprising the steps of:
    placing a mandrel into a braiding machine, with the mandrel having a mandrel body, a radially outer tang and a radially inner tang for holding the mandrel relative to the braiding machine, the mandrel extending between a leading edge and a trailing edge and the radially outer tang with a width in a direction between the leading edge and the trailing edge that is smaller than a distance between the leading edge and trailing edge of the mandrel such that there is a ledge leading into the outer tang;

the mandrel body having a width in a direction between the leading edge and the trailing edge that transitions into the inner tang beyond an outer location that will serve as a base for the braided material, and a location to mount the inner tang into the braiding machine, and the mandrel body transitions smoothly into the inner tang, with the width of the inner tang between the leading edge and the trailing edge and the width of the mandrel body radially outwardly of the outer location being equal; and braiding ceramic matrix composite ("CMCs") yarn about a portion of the mandrel which serves as the base for the braided yarn to form a shear tube.

2. The method as set forth in claim 1, wherein outer CMC fabric layers are then placed outwardly of the braided shear tube to form an intermediate vane.

3. The method as set forth in claim 2, wherein the intermediate vane is then placed into a densifying chamber wherein the CMC materials are densified.

4. The method as set forth in claim 3, wherein the inner tang has a locating pin hole that receives a pin from a holding structure such that the intermediate vane is properly positioned within the densifying chamber.

5. The method as set forth in claim 4, wherein the braiding machine has a plurality of spools of CMC yarn that are braided onto the outer surface of the mandrel.

6. The method as set forth in claim 5, wherein a plurality of shear tubes are formed by distinct mandrels and then utilized to form the intermediate vane.

7. The method as set forth in claim 6, wherein the intermediate vane has a plurality of hollow channels, and the shear tubes defining the hollow channels, and serving as a base for the outer CMC fabric layers.

8. The method as set forth in claim 7, wherein the inner tang has a thickness that decreases from the outer location to a radially inner end.

9. The method as set forth in claim 2, wherein the braiding machine has a plurality of spools of CMC yarn that are braided onto the outer surface of the mandrel.

10. The method as set forth in claim 9, wherein a plurality of shear tubes are formed by distinct mandrels and then utilized to form the intermediate vane.

11. The method as set forth in claim 10, wherein the intermediate vane has a plurality of hollow channels, and the shear tubes defining the hollow channels, and serving as a base for the outer CMC fabric layers.

12. The method as set forth in claim 11, wherein the inner tang has a thickness that decreases from the outer location to a radially inner end.

13. The method as set forth in claim 10, wherein the inner tang has a thickness that decreases from the outer location to a radially inner end.

14. The method as set forth in claim 1, wherein the braiding machine has a plurality of spools of CMC yarn that are braided onto the outer surface of the mandrel.

15. The method as set forth in claim 1, wherein a plurality of shear tubes are formed by distinct mandrels and then utilized to form an intermediate vane.

16. The method as set forth in claim 1, wherein the inner tang has a thickness that decreases from the outer location to a radially inner end.

17. The method as set forth in claim 1, wherein an intermediate vane is then placed into a densifying chamber wherein the CMC materials are densified.

18. A mandrel to provide a base for braiding yarn comprising:

a mandrel body, a radially outer tang and a radially inner tang for holding the mandrel relative to a braiding machine, the mandrel body extending between a leading edge and a trailing edge and the outer tang has a width in a direction between the leading edge and the trailing edge that is smaller than a distance between the leading edge and trailing edge of the mandrel body such that there is a ledge leading into the outer tang;

the mandrel body having a width in a direction between the leading edge and the trailing edge that transitions into the inner tang beyond an outer location that will serve as a base for the braided material, the mandrel body transitions smoothly into the inner tang, with the width of the inner tang between the leading edge and the trailing edge and the width of the mandrel body radially outwardly of the outer location being equal; and wherein the inner tang has a thickness that decreases from the radially outer end to a radially inner end, with the thickness being defined as a distance between the leading edge and the trailing edge.

19. The mandrel as set forth in claim 18, wherein the inner and outer tangs are to be mounted in mounting structure in a braiding machine.

* * * * *